United States Patent [19]
Denker

[11] 3,724,334
[45] Apr. 3, 1973

[54] MECHANICAL DRIVING
[75] Inventor: James M. Denker, Scituate, Mass.
[73] Assignee: Nutron Corporation, Hingham, Mass.
[22] Filed: June 11, 1971
[21] Appl. No.: 152,253

Related U.S. Application Data
[63] Continuation-in-part of Ser. No. 843,545, July 22, 1969, Pat. No. 3,584,542.

[52] U.S. Cl. ..................91/491, 91/498, 92/58, 91/176, 74/55
[51] Int. Cl. ..................F01b 13/06, F01b 15/00
[58] Field of Search ......92/72, 58; 91/491, 492, 497, 91/498, 176; 74/55

[56] References Cited
UNITED STATES PATENTS
3,046,950    7/1962    Smith ........................91/498
2,895,426    7/1959    Orshansky ...................91/492
2,035,647    3/1936    Ferris .......................91/498

*Primary Examiner*—Martin P. Schwadron
*Assistant Examiner*—A. M. Zupcic
*Attorney*—Wm. W. Rymer

[57] ABSTRACT

A fluid device including, in a first aspect, a fixed member defining a first cam surface having $m$ cycles, a movable member defining a second cam surface having $n$ cycles, and a movable piston support carrying fewer than the greater of $m$ and $n$ pistons each of which is mounted for movement relative to the piston support and engages the cam surface; and, including in a second aspect, a hydrostatic piston assembly mounted on a piston support for movement relative thereto in engagement with at least two cam surfaces.

26 Claims, 4 Drawing Figures

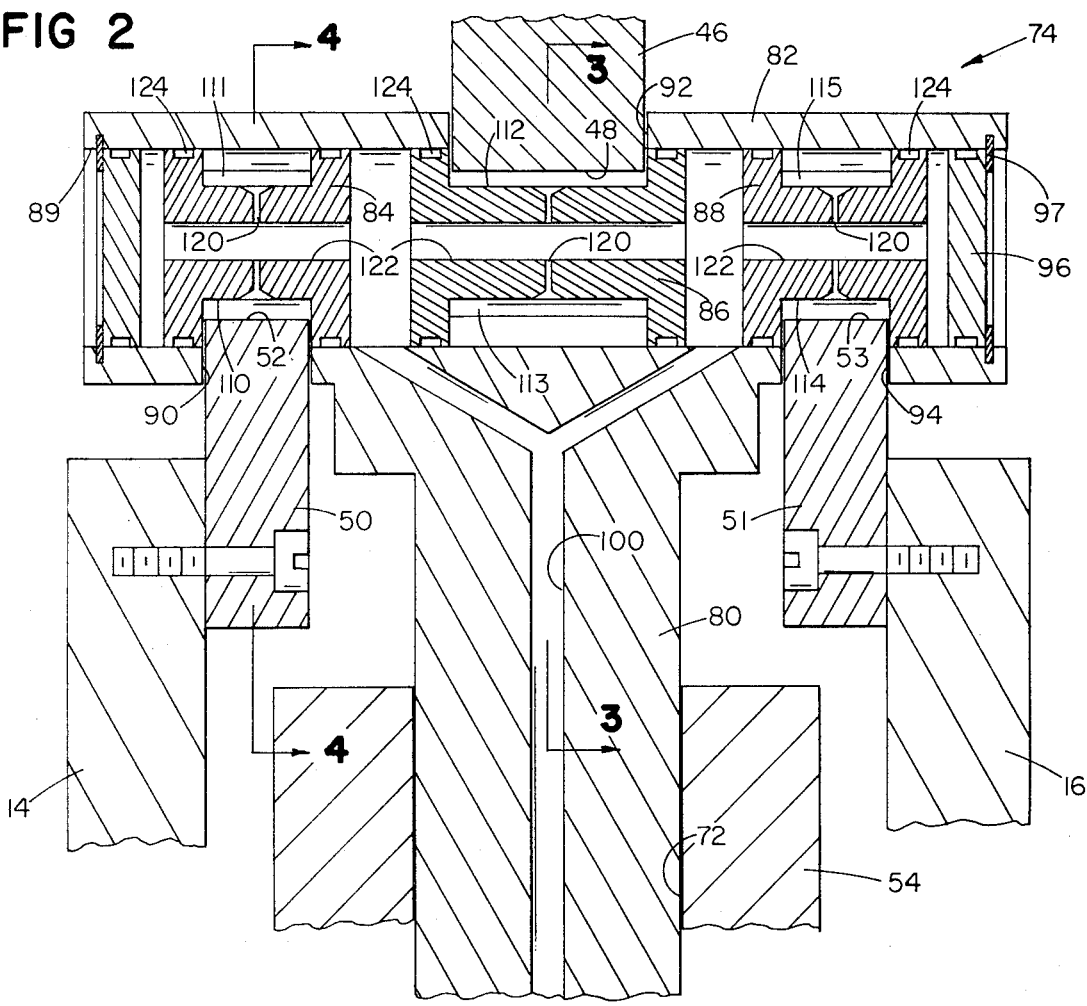
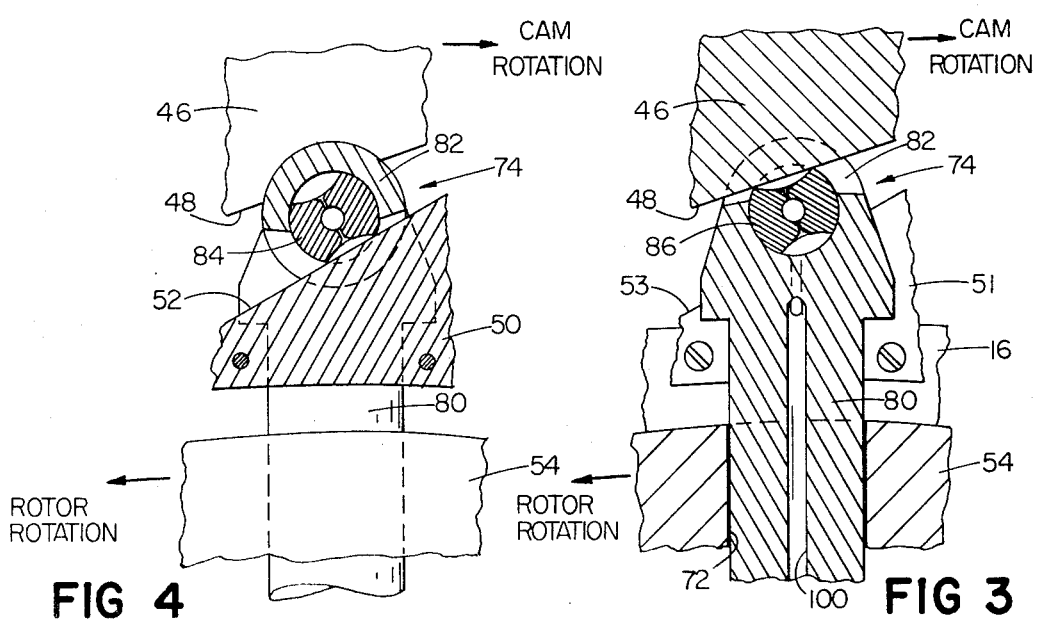

MECHANICAL DRIVING

This invention relates to mechanical driving. This application is a continuation-in-part of my copending application Ser. No. 843,545 entitled "Mechanical Driving," filed July 22, 1969 now U.S. Pat. No. 3,584,542.

It is a primary object of the present invention to provide a mechanical driving device which is especially suited for use as a pump and in which no load is applied by or through the piston-carrying member. Other objects, include providing a very low-friction hydrostatic piston assembly for use in such multiple-cam fluid devices.

A first aspect of the invention features a fluid device including a fixed member defining a first cam surface of $m$ cycles, a movable member defining a second cam surface of $n$ cycles, and a movable piston support carrying fewer than the greater of $m$ and $n$ pistons mounted for movement relative to the piston support and engaging the cam surfaces. In a second aspect there is featured, in a fluid drive including at least two cam surfaces, a relatively movable piston support and a piston mounted on the support in engagement with the cam surfaces, that improvement wherein the piston comprises a hydrostatic piston assembly including a piston portion mounted in part within a bore of the support for movement relative to the bore, a support portion fixed to the piston portion, a pair of followers engaging respective ones of the said cam surfaces and movably mounted within a recess in the support portion, and conduits providing fluid communication between the followers and support bore. Preferred embodiments featuring both aspects include also a third cam surface identical to the first or second cam surface, two of the cam surfaces facing in generally opposite directions, and $|m - n|$ pistons, each of which includes three hydrostatically supported cam followers.

Other objects, features, and advantages will appear from the following detailed description of a preferred embodiment of the invention taken together with the drawings in which:

FIG. 2 is a sectional view, of portions of the device of FIG. 1; and,

Figure 1:
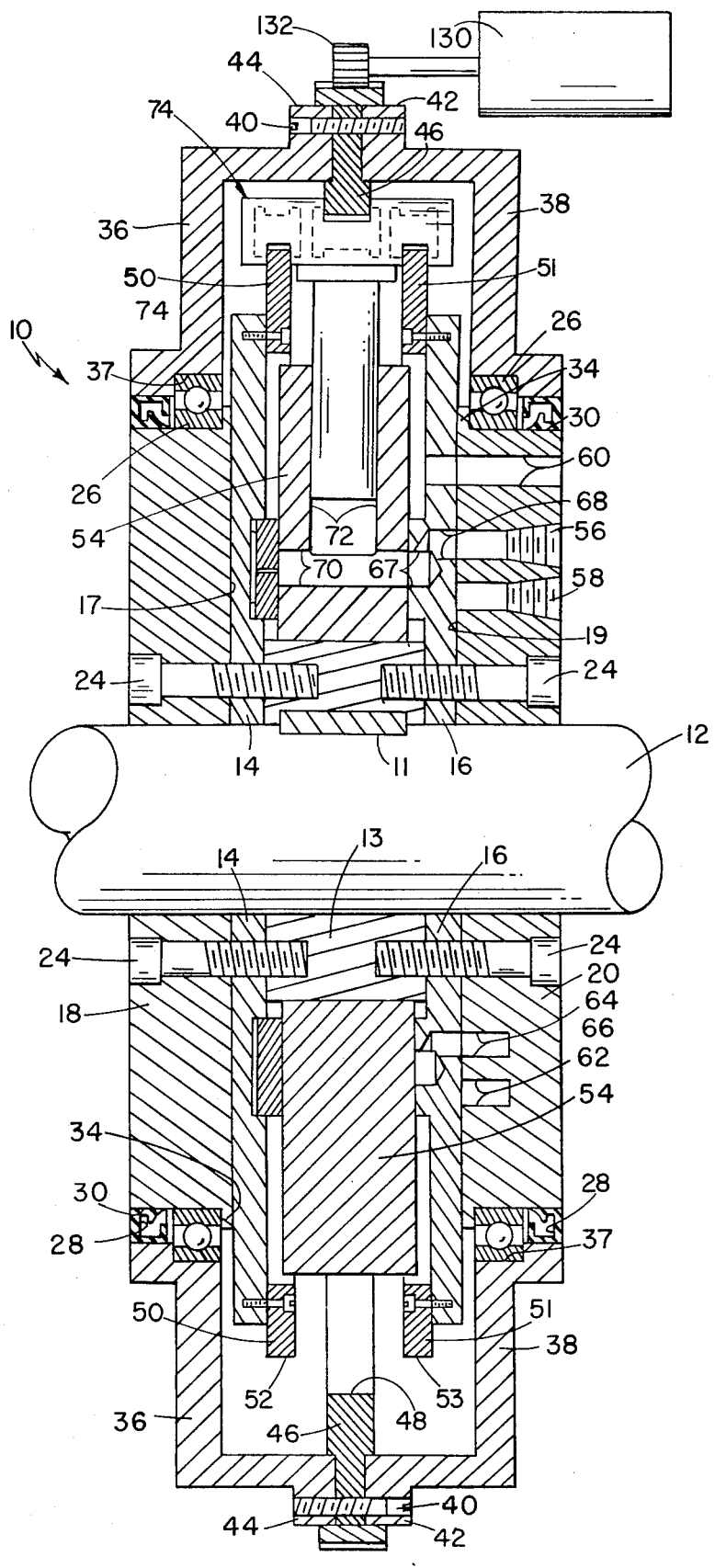
FIG. 1 is a sectional view of a fluid device embodying the invention.

FIGS. 3 and 4 are sectional views, taken respectively at lines 3—3 and 4—4 of FIG. 2.

Referring more particularly to the drawings, there is illustrated in FIG. 1 a rotary fluid pump, generally designated 10, mounted coaxially on a fixed shaft 12 by a key 11. As shown, pump 10 includes an annular central support 13 fixed to key 11, a pair of cam support plates, designated 14 and 16 respectively, on opposite sides of support 13, and a pair of end plates, designated 18 and 20 respectively, each of which engages the outer axial face of one of plates 14, 16. Bolts 24 fix the central support, cam support plates, and end plates relative to each other. A ball bearing 26 and annular seal 28 are mounted on the cylindrical outer surface 30 of each of end plates 18, 20 with the inner edge of the bearing inner race engaging an annular lip 34 at the inner axial face 17, 19 of the respective end plate.

A pair of movable, cylindrically stepped, annular outer case sections 36, 38 are mounted coaxially surrounding end plates 18, 20 with the inner radially facing surface 37 of each case section engaging the bearing 26 and seal 28 mounted on one of end plates 18, 20. Case sections 36, 38 are connected to each other by bolts 40 extending between respective radial flanges 42, 44 at the outer periphery of each case section. As shown, an annular cam member 46, defining a radially inwardly facing cam surface 48, is fixed between the axially facing surfaces of flanges 42, 44 by bolts 40. Fixed cams 50, 51 defining a radially outwardly facing cam surfaces 52, 53, are mounted on cam support plates 14, 16 with cam surfaces 52, 53 in substantial axial alignment with cam surface 48 of cam member 46. A rotor 54 is mounted for rotation on central support 12 within the annular chamber 55 defined by central support 12 and case sections 36, 38. A total of five conduits 70, arranged and spaced at regular 72° intervals around a circle coaxial with rotor 54, extend axially through the rotor. A cylindrical bore 72 extends radially from each conduit 70 to the outer cylindrical surface of rotor 54, and a piston assembly, generally designated 74, is mounted in each bore for movement radially relative to the rotor.

End plate 20 includes drilled inlet and outlet conduits, designated 56 and 58 respectively, extending through the thickness thereof, and drain conduit 60 extending through the thickness of end plate 20 and support plate 16 to chamber 55. The outer portion of each conduit is tapped for receiving a fluid coupling. A pair of radially spaced, inwardly facing annular channels 62, 64 are provided in the inner axial face of end plate 20. Inlet conduit 56 communicates at its inner end with channel 62, and outlet conduit 58 communicates at its inner end with channel 64.

A total of 14 drilled conduits 66, arranged generally in a circle and spaced at regular intervals therearound, extend through cam support plate 16. As shown, each conduit 66 is defined by a pair of off-set conduit portions. The inner portion 67 of each of conduit 66 terminates in a port at the inner axially facing wall of port plate 16 in position for communicating with rotor conduits 70 during rotation of rotor 54 relative to the support plate. The outer portion 68 of each conduit 66 communicates with one of channels 62, 64. Half of conduits 66 communicate with each of channels 62, 64, the conduits alternating between channels so that one of any pair of adjacent conduits connects with each.

Each of cam surfaces 48, 52, and 53 is a generally annular, modified trapezoidal acceleration cam surface comprising alternating parabolic and intermediate fairing sections. The period of cam surface 48 is 180° (that is, the entire cam surface includes two cycles, each having one minimum displacement point or peak and one maximum displacement point or valley). Each of cam surfaces 52, 53 has seven identical cycles, each of approximately 52° (360°⁄7). The amplitude (difference in radial displacement from peak to valley) of all cycles of three cam surfaces is the same and the minimum displacement points of all three cam surfaces are tangent to cylinders coaxial with the rotor. Each of cam surfaces 52, 53 is half as wide (measured axially of pump 10) as cam surface 48. In practice, the pump is assembled with the high points (maximum diameter) of the cam surfaces of fixed cams 50, 51 radially aligned with those of drilled conduits 66 which communicate, through channel 64, with outlet conduit 58. In this position, the low points (minimum diameter) of the cam surfaces will be radially aligned with those of drilled conduits 66 communicating with channel 62 and inlet conduit 56.

Reference is now made to FIG. 2 which illustrates in more detail the construction of piston assemblies 74. As shown, each piston assembly includes a cylindrical piston 80 slip-fitted within a respective one of rotor bores 72, a follower support 82 extending transversely of piston 80, and three followers, designated 84, 86, and 88, mounted in a cylindrical bore 89 extending longitudinally of support 82. The portions of support 82 overlying each of followers 84, 86, 88 are removed to provide openings, designated 90, 92, 94 respectively, through which the respective cams and followers engage each other. End plates 96 (with O-ring seals) and snap rings 97 close the opposite ends of bore 89. A Y-shaped conduit 100 extends from the inner end of piston 80 (within bore 72) to bore 89 of support 82, terminating at ports intermediate adjacent pairs of followers 84, 86, 88.

Each of followers 84, 86, 88 is a hollow cylinder from which a pair of arcuate in axial-cross section segments have been removed to provide a pair of diametrically oppositely facing recesses. Thus, follower 84 includes opposed recesses 110, 111; follower 86 includes recesses 112, 113; and the removed segments of follower 88 define recesses 114, 115. Additionally, each follower includes an orifice 120 extending from the follower's central bore 122 to each of the follower's recesses, and a pair of annular, outwardly facing channels 124, one on each side of the follower's recesses.

As shown, followers 84, 86, 88 are spaced axially from each other and from end plates 96. Cam 50 projects into opening 90 of piston support portion 82 and its cam surface 52 engages the axially extending edges of recess 110 of follower 84. Similarly, each of cams 46, 51 project into a respective one of openings 92, 94 so that cam surfaces 48, 53 engage the edges of respective ones of recesses 112, 114 of followers 86, 88. Both recesses of each of followers 84, 86, 88 are of the same width, and the recesses of follower 86, are twice as wide as those of followers 84, 88.

In pumping, movable cam 46 is driven in rotation by a motor 130 whose output 132 engages gear 134 on the outer periphery of cam 46. Shaft 12 and end plates 18 and 20 are fixed. With movable cam 46, case sections 36, 38 rotate on bearings 26 relative to the fixed shaft and end plates. Rotation of cam member 46 will cause rotor 54 to rotate relative to shaft 12 in the opposite direction, drawing fluid into pump 10 through inlet conduit 56 and pumping fluid from the pump, at high pressure, through outlet conduit 58. A pumping stroke commences when a piston assembly 74 is at its radially outermost position, with the assembly followers 84, 86, 88 engaging maximum diameter portions of cam surfaces 48, 52, 53. With the assembly in this position, the rotor bore 72 in which it is mounted communicates with a drilled conduit connected to outlet 58.

Reference is now made to FIGS. 3 and 4 which illustrate the relative movement of cams 46, 50, 51, piston assembly 74, and rotor 54. As shown in FIG. 3, rotation of cam 46 (to the right as illustrated) from a position in which piston assembly 74 engages a maximum diameter point of cam surface 48 forces piston assembly 74 radially inwardly and, through interaction between piston assembly 74 and fixed cams 50, 51, causes rotor 54 to rotate oppositely to cam 46 (to the left as illustrated).

From a position in which it engages a maximum diameter point of cam surface 48, piston assembly 74 moves radially inwardly through the first approximately 26° (one-half cycle of fixed cams 50, 51) of rotor 54, each of its followers 84, 86, 88 sliding on a respective cam surface separated therefrom by a thin film of hydraulic fluid. As piston assembly 74 reaches its radially innermost position, the bore 72 in which it is positioned moves out of communication with outlet 68 and into communication (through the adjacent one of drilled conduits 66) with inlet 56.

FIG. 4 illustrates the interaction between fixed cams 50, 51 and piston assembly 74 during the next approximately 26° of rotor rotation (such rotation being caused by interaction between another of piston assemblies 74 and cam 46). As shown, fixed cam surfaces 52, 53 engage the radially inner recesses 100, 114 of cam followers 84, 88 and force piston assembly 74 outwardly, drawing fluid into the bore 72 through inlet 56.

The relative rotation of cam member 46 and rotor 54 is given by the following equation, wherein $M$ is the number of cycles of each of fixed cam surfaces 52, 53, $N$ is the number of cycles of movable cam surface 47, and $\omega$ is the angular rotation of the indicated one of the cam and rotor:

$$\omega 46/\omega 54 = N-M/N$$

In the disclosed embodiment, it is thus apparent that, for each revolution of cam member 46, rotor 54 will complete 2.5 revolutions in the opposite direction.

The amount of fluid pumped per revolution of cam member 46, $D$, is equal to:

$$D = (d)(M)(N),$$

wherein $d$ is the displacement (area times stroke) of one of piston assemblies 74. The stroke of each piston assembly, of course, is equal to the amplitudes of the cycles of cam surfaces 48, 52, 53.

Referring again to FIGS. 2–4, it will be seen that fluid in a rotor bore 72 will pass through conduit 100 into bore 89 of support 82, filling the spaces between the followers in bore 89 and the follower bores 122 themselves. The pressure of fluid in follower bores 122 and rotor bore 72 is substantially the same. The pressure of fluid in the follower recesses, due to orifices 120, is less than that in follower bores 122. Fluid leakage from bore 89 and from the follower recesses flows into the vent channels 124 of the various followers and thence, through one of openings 90, 92, 94 into chamber 55. The amount of leakage is quite small, the clearance between the cylindrical portions of the followers and the interior of bore 89 being on the order of 0.001 inch.

Other embodiments within the scope of the following claims will occur to those skilled in the art.

What is claimed is:
1. A device comprising
   a fixed cam defining a first cam surface having $M$ cam cycles;
   a movable cam defining a second cam surface having $N$ cam cycles;
   a movable piston support; and,

P pistons mounted on said support for movement relative thereto, each of said pistons engaging said first cam surface and said second cam surface, $M$ and $N$ being integers, $M$ being not equal to $N$, and $P$ being less than the greater of $M$ and $N$.

2. The device of claim 1 wherein $P$ is equal to $|M-N|$.

3. The device of claim 1 wherein said pistons are regularly spaced at intervals of $360/P$ degrees.

4. The device of claim 1 wherein said cam surfaces face in generally opposite directions.

5. The device of claim 1 wherein each of said cam surfaces is closed, the amplitude of each cycle of said first cam surface is equal to the amplitude of each cycle of said second cam surfaces, each of the cycles of said first cam surface are identical and each of the cycles of said second cam surface are identical.

6. The device of claim 1 wherein said movable cam is mounted for rotation relative to said fixed cam and said piston support is mounted for rotation relative to said fixed cam.

7. The device of claim 6 wherein said pistons are movable radially of the axis of rotation of said piston support.

8. The device of claim 7 wherein each of said cam surfaces is annular, one of said surfaces faces generally radially outwardly, and the other of said surfaces faces radially inwardly.

9. The device of claim 1 wherein said device includes a third cam defining a third cam surface having $M$ or $N$ cycles, and each of said pistons engages said third cam surface.

10. The device of claim 9 wherein said third cam surface is identical to one of said first and second cam surfaces.

11. The device of claim 1 wherein said piston support is mounted for rotation relative to said fixed cam and includes $P$ regularly spaced bores, and each of said pistons includes a first portion mounted at least in part within one of said bores for movement relative to said support.

12. The device of claim 11 wherein each of said pistons includes a second portion on which a pair of followers are movably mounted, each of said followers engaging one of said cam surfaces.

13. The device of claim 12 wherein each of said followers is mounted within a recess in said second portion, and said piston includes conduits providing fluid communication between said one bore and each of said recesses.

14. The device of claim 13 including a third cam defining a third cam surface having $M$ or $N$ cycles, and wherein each of said pistons includes three followers mounted on said second portion for movement relative thereto, each of said followers engaging one of said cam surfaces.

15. The device of claim 13 wherein one of said cam surfaces faces generally radially inwardly and another of said cam surfaces faces generally radially outwardly.

16. In a fluid device including at least two cam surfaces, a piston support movable relative to the cam surfaces, and a piston mounted on the support for movement relative thereto in engagement with the cam surfaces, that improvement wherein the piston comprises a hydrostatic piston assembly including:
a first portion mounted at least in part within a bore in said support;
a second portion fixed to said first portion and extending exteriorly of said bore;
at least two followers mounted within a recess in said support portion and engaging respective ones of said cam surfaces; and
conduits providing fluid communication between said followers and said bore.

17. The device of claim 16 wherein each of said followers defines a pair of oppositely facing concave surfaces and includes a conduit extending between said surfaces, one of said concave surfaces facing and engaging each of said cam surfaces.

18. The device of claim 16 including a third cam surface and wherein said piston includes three followers mounted for movement on and relative to said second portion independently of each other, each of said followers engaging one of said cam surfaces.

19. The device of claim 16 wherein said second portion includes a cylindrical bore extending longitudinally thereof in which said followers are mounted, and defines an opening overlying each of said followers, each of said followers engaging a respective one of said cam surfaces through a respective one of said openings.

20. The device of claim 19 wherein each of said followers defines a pair of oppositely facing concave surfaces, one of said concave surfaces engaging each of said cam surfaces, and said piston assembly includes conduits permitting fluid communication between each of said concave surfaces and said bore of said piston support.

21. The device of claim 20 wherein each of said followers includes a conduit extending between the concave surfaces of said each follower, and said piston assembly includes a conduit extending from a surface thereof within said bore of said piston support to said bore of said second portion.

22. The device of claim 21 wherein each of said followers includes an outer generally cylindrical surface in closely spaced relationship to the surface of said bore of said piston support and a central bore extending coaxially through said follower.

23. The device of claim 22 including a third cam surface and wherein said piston assembly includes three followers mounted for movement on and relative to said second portion, each of said followers engaging one of said cam surfaces.

24. The device of claim 23 wherein one of said cam surfaces faces in one direction and another of said cam surfaces faces in a direction generally opposite to said one direction.

25. The device of claim 24 wherein said piston support is mounted for rotation about an axis, said cam surfaces are generally annular and are mounted coaxially with said piston support, and said one direction is generally radially inwardly.

26. The device of claim 20 wherein each of followers includes a pair of axially spaced, radially outwardly facing channels, one of said pair being positioned on each axial side of the concave surfaces of said each follower.

* * * * *